United States Patent Office 3,846,246
Patented Nov. 5, 1974

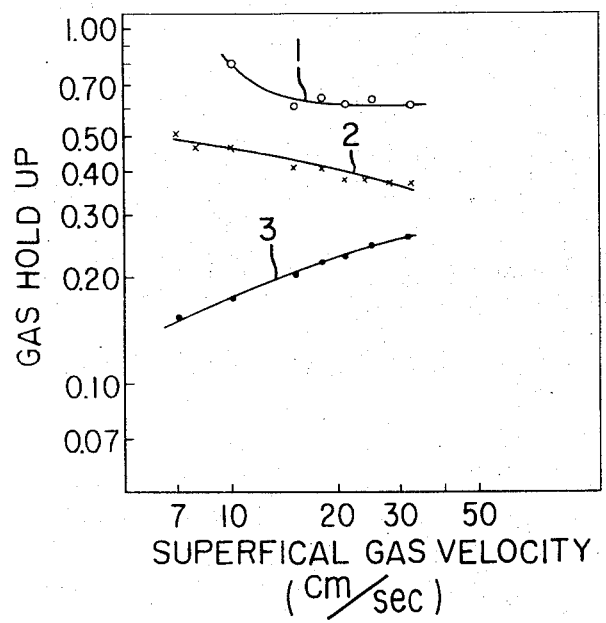

3,846,246
CULTIVATION PROCESS FOR MICRO-ORGANISMS
Yoshinori Midorikawa, Yokohama, and Tsuneo Sasanami, Chigasaki, Japan, assignors to Dainippon Ink and Chemicals, Inc., and Japan Gasoline Co., Ltd., both of Tokyo, Japan
Filed Jan. 9, 1974, Ser. No. 431,917
Int. Cl. C12b 1/14
U.S. Cl. 195—109                    2 Claims

ABSTRACT OF THE DISCLOSURE

A process for aerobic cultivation of micro-organisms by employing a bubble column fermentor, wherein the air-blowing velocity is controlled to be in the range of 14–32 cm./sec. in terms of the superficial gas velocity to thereby restrian the formation of a foam layer and expedite steady cultivation of micro-organisms.

BACKGROUND OF THE INVENTION (a) Field of the Invention

The present invention relates to an improvement in the cultivation process for micro-organisms by the use of a bubble column fermentor.

(b) Description of the Prior Art

The cultivation of micro-organisms by the use of a bubble column fermentor is generally conducted by introducing a proper quantity of air into the culture medium within the fermentor through an air-blowing nozzle. This culture medium is mixed with and agitated by the action of the injected air. Subsequently, after growth of micro-organisms has occurred the cultivation liquid containing micro-organisms is drawn out of the fermentor, the micro-organisms are separated from the cultivation liquid and the waste liquor is discharged out of the cultivation system. As for this cultivation mechanism for micro-organisms, it is generally explained on the basis that oxygen contained in the bubbles is dissolved in the culture medium by virtue of the agitation, the oxygen reaches the cells of micro-organisms and contributes to the growth of micro-organisms together with other nutritive elements within the culture medium. In case of the yeast cultivation, for instance, it has been usual to effect the aeration at a superficial gas velocity in the range of 5–10 cm./sec. in the prior art. Even in case of the hydrocarbon fermentation, such as employing a bouyant and hydrophobic substance like normal paraffin as the substrate, cultivation can be performed at a superficial gas velocity in the range of 7–10 cm./sec. and also in the case of yeast for bread, cultivation is generally performed at a superficial gas velocity in the range of 7–10 cm./sec. However, in light of the fact that these cultivations are all accompanied by generation of foams, as a countermeasure to restrain such generation of foams, utilization of some defoaming agent (or defoaming apparatus) has hitherto been prevalently practiced. Though the degree of generation of foams in these cultivations varies with the type of cultivation and the phase of the cultivation, if no adequate measure is taken to cope with this foaming, there will occur such troubles as set forth below. In other words, the conventional process wherein the superficial gas velocity is usually set in the range of 5–10 cm./sec. is admittedly practically satisfactory from the view point of effecting the mixing of the culture solution. However, it has a serious defect that the culture medium becomes foamy and, as a result, a foam layer is formed in the upper part of the fermentor foam accumulated gradually and eventually overflows to the outside of the fermentor. This is attributable to the generation of gases such as carbon dioxide, etc. accompanying the growth of micro-organisms and substances produced by metabolism thereof. Unless an appropriate measure is taken to cope with the generation of such a large volume of foams, not only will the effect of agitation become insufficient but also the foam layer will adsorb micro-organisms to make them float. As a result, unevenness of the culture solution as well as the concentration of micro-organisms will be brought about to inhibit the growth of cells remarkably and extremely reduce the growth rate thereof. Accordingly, there is a need for adjusting the volume in the fermentor by taking the large volume of foams to be generated into consideration in advance, but such a countermeasure is not only very disadvantageous from the view point of the capacity of the apparatus but also is disadvantageous to the adoption of a continuous cultivation process.

Meanwhile, for the purpose of controlling the generation of a large volume of foams as stated above, varieties of chemical and mechanical countermeasures have hitherto been contrived. For instance, in the case of cultivation of yeast for bread, application of such defoaming agents as silicone oil has been proposed and proved considerably fruitful. However, these defoaming agents are comparatively expensive so that they have a serious effect on the price of the products, and, besides, the chemical properties of these defoaming agents are often not helpful to the metabolism of yeast and deteriorate the yield. As for the apparatus for mechanical defoaming, application of a special apparatus such as the gas-liquid separator (e.g., the foam breaker disclosed in Japanese Patent Publication No. 16,527/1966; the aerobic fermentation apparatus disclosed in Japanese Patent Publication No. 26,041/1964) devised to break foams upon introducing the foam layer together with the cultivation liquid to the outside of the fermentor is prevalent. However, inasmuch as the conventional apparatuses like the said gas-liquid separator are of special construction, they are defective in that not only is the cost of manufacture thereof expensive but also they are apt to get out of order. Moreover, their defoaming effect is not always satisfactory. Besides, even the cost of manufacturing the fermentor per se to be incorporated with these apparatuses is rather high as it should be constructed by taking into consideration the space for the foam layer to be formed.

SUMMARY OF THE INVENTION

The inventors, with a view to overcoming the foregoing defects in the prior art, have continued a series of studies and have found that the blowing velocity (as the superficial gas velocity) of air constituting the power source for agitation is closely related with the phenomena of foaming and defoaming by engulfing the foams in liquid.

One object of the present invention is to provide a cultivation process for micro-organisms, which forms either no foam layer or just a little of foam layer, and accomplishes a satisfactory cultivation of micro-organisms. Another object of the present invention is to provide a cultivation process for micro-organisms, which accomplishes a satisfactory cultivation without resorting to the use of either a defoaming agent or a defoaming apparatus. Still another object of the present invention is to provide a cultivation process for micro-organisms, which accomplishes a satisfactory cultivation at a comparatively low cost.

In other words, the present invention is intended to provide a cultivation process for micro-organisms, which is characterized in that, at the time of cultivating micro-organisms by the use of a bubble column fermentor, a steady cultivation of micro-organisms is expedited by restraining the formation of foam layer by controlling the air-blowing velocity as the superficial gas velocity to be in the range of 14–32 cm./sec. According to the process according to the present invention as above, the cultivation is operated at a superficial gas velocity in the aforesaid range even during the early stage of cultivation, and it has been confirmed that any modification of the superficial gas velocity within this range entails no such formation of foam layer as will inhibit the desired cultivation, and, accordingly, the cultivation progresses satisfactorily.

The reason why the adoption of the foregoing range of superficial gas velocity is so effective in restraining the formation of foam layer compared with the prior art is not yet clarified, but it may be generally explained as follows. The greater is the quantity of air being supplied, the greater is the increase in the agitation effect and the defoaming effect, and, on the other hand, the distribution of density of the culture solution and the adsorption of cells on to the foam layer remarkably decrease. When the superficial gas velocity exceeds 32 cm./sec., the defoaming effect admittedly increases considerably, but the generation of accompanying splashes attributable to the so-called air-lift action becomes conspicuous, causing such troubles that a large quantity of the liquid is brought out of the fermentor and the efficiency of the power for aeration decreases due to the so-called "draught," and therefore, it is undesirable. On the other hand, when the superficial gas velocity is less than 14 cm./sec., it can not contribute to the defoaming effect. Such being the case, the appropriate superficial gas velocity to be applied in the present invention is in the range of 14–32 cm./sec.

The shape of the bubble column fermentor for use in the present invention is not limited, and various modifications of the bubble column are also contemplated.

As the micro-organisms applicable to the process according to the present invention, in addition to yeast, there are bacteria, fungi, actinomyces, algae, mushrooms, etc. Accordingly, the reaction field is not limited to those utilizing sugar fermentation and petroleum fermentation such as in the following experiments and embodiments.

The effects of the present invention are as summarized below.

(1) As the defoaming is effected within the column, there is not required subsidiary equipment that will bring increase in the cost of products, such as in the case of effecting the defoaming outside the column (employing a defoaming apparatus).

(2) As for the volumetric capacity, compared with the conventional fermentor wherein it is usually about 25% of the whole fermentor, in the case of the process according to the present invention, it is increased up to about 40% and is much more advantageous.

(3) As there is no need for a defoaming agent or defoaming apparatus, the process is simplified, and the chance of the apparatus going wrong can be minimized.

(4) As the formation of a foam layer can be prevented and the deficiency ascribable to biochemical reaction can be eliminated, the process according to the present invention is very advantageous for industrial use.

BRIEF DESCRIPTION OF THE DRAWING

Referring to the appended drawing, FIG. 1 is a curve illustrative of the relation between the gas hold-up within a bubble column fermentor and the superficial gas velocity according to experiments.

DESCRIPTION OF THE PREFERRED EMBODIMENTS

Hereunder shown are the experiments and the embodiments of the present invention. In this context, percent signifies percent by weight.

Experiment 1

By filling water in a bubble column fermentor with a ring type sparger, the superficial gas velocity and the gas hold-up were compared. In this connection, the inside diameter of the fermentor was 19.4 cm. and the height thereof was 300 cm.

| Superficial gas velocity (cm./sec.): | Gas hold-up |
|---|---|
| 7.1 | 0.152 |
| 10.1 | 0.176 |
| 15.2 | 0.203 |
| 18.2 | 0.219 |
| 21.2 | 0.231 |
| 25.2 | 0.248 |
| 31.5 | 0.262 |

With the increase in an superficial gas velocity, there was observed an increase in the gas hold-up. The relation between the superficial gas velocity and the gas hold-up was as shown by the curve 3 in FIG. 1.

Experiment 2

By filling a culture medium in the fermentor employed in Experiment 1, the superficial gas velocity and the gas hold-up were compared.

| Superficial gas velocity (cm./sec.): | Gas hold-up |
|---|---|
| 6.9 | 0.174 |
| 9.8 | 0.219 |
| 14.8 | 0.237 |
| 17.8 | 0.262 |
| 24.0 | 0.291 |

Like in Experiment 1, with an increase in the superficial gas velocity, there was observed the increase in the gas hold-up. The gas hold-up in this case was somewhat greater than in the case of water.

Experiment 3

By preparing water and yeast in a bubble column fermentor with a nozzle, the superficial gas velocity and the gas hold-up were compared. The concentration of yeast was 1.1% on a dry basis. In this case, there was no growth of yeast.

|  | Cm. |
|---|---|
| Inside diameter of fermentor | 15.0 |
| Height of fermentor | 300 |

| Superficial gas velocity (cm./sec.): | Gas hold-up |
|---|---|
| 5.3 | 0.075 |
| 9.8 | 0.126 |
| 14.3 | 0.153 |
| 17.6 | 0.155 |
| 18.6 | 0.154 |

When compared with Experiment 1, the gas hold-up in this case was rather small. This experiment shows that yeast which does not grow does not cause foaming.

Experiment 4

By preparing a culture medium and yeast in the fermentor employed in Experiment 1, the superficial gas velocity and the gas hold-up were compared. Further, the distributions of density within the fermentor in the direction of the height thereof were compared. The concentration of yeast at the start was in the range of 1.0–1.1% on a dry basis, and it was in the range of 1.9–2.0% at the time of measurement. In the present case, there was observed growth of the yeast during progress of the experiment.

Superficial gas velocity (cm./sec.):     Gas hold-up
- 10.0 — 0.803
- 14.9 — 0.612
- 18.1 — 0.637
- 21.2 — 0.614
- 25.0 — 0.632
- 32.0 — 0.610

There was a great difference in the gas hold-up between the case where the superficial gas velocity was 10.0 cm./sec. and the case where said velocity was 14.9 cm./sec. When the superficial gas velocity was more than 14.9 cm./sec., the gas hold-up stayed low. Curve 1 in FIG. 1 is illustrative of this relation. In the case where the superficial gas velocity was more than 14.9 cm./sec., the maximum density was 0.65 and the minimum density was 0.25, while in the case where the superficial gas velocity was 10 cm./sec., the maximum density was 0.65 and the minimum density was 0.05. It is evident that in the case where the superficial gas velocity was in the range of from more than 14.9 cm./sec. to 25.0 cm./sec., the variation of the density within the column was minimized. In this range, the circulation of liquid inside the column was brisk, and there was observed no foam layer staying on the surface of the liquid. The term "density" employed herein means the density of a liqud containing air during operation and is expressed by the number of grams per 1 ml.

Experiment 5

By filling a detergent in the fermentor employed in Experiment 1, the superficial gas velocity and the gas hold-up were compared. The concentration of the detergent was 10 mg. per 1 l. of liquid.

Superficial gas velocity (cm./sec.):     Gas hold-up
- 7.1 — 0.508
- 8.1 — 0.471
- 10.1 — 0.474
- 15.2 — 0.413
- 18.2 — 0.410
- 21.2 — 0.377
- 24.3 — 0.377
- 28.0 — 0.372
- 32.0 — 0.370

When the superficial gas velocity was more than 15.2 cm./sec., the gas hold-up was less than about 0.4, and when the superficial gas velocity was less than 10.1 cm./sec., the gas hold-up was about 0.5. Even in the case of employing the detergent as a foaming substance not containing organisms, there was observed a relaton similar to that in Experiment 4 employing a foamng substance containing organisms. This relation is as shown by the curve 2 in FIG. 1.

As is evident from the foregoing experiments, when yeast is cultivated by operating a bubble column fermentor at a superficial gas velocity in the range of from more than 14.9 cm./sec. to 32.0 cm./sec., a foam layer is scarcely formed, the liquid in the upper part of the fermentor is sufficiently agitated to mix with the liquid in the lower part, the circulation of the liquid inside the column is so brisk that it is free from such bad environments as will bring on the adsorption, floatation, etc. of yeast cels, and accordingly, a very satisfactory growth of yeast can be expected.

Example 1

By employing a bubble column fermentor with ring type sparger having an inside diameter of 19.4 cm., and a height of 300 cm., 29 l. of culture medium prepared by dissolving 3 g. of urea, 2.5 g. potassium phosphate dibasic, 1 g. of crystal magnesium sulfate, 0.1 g. of corn steep liquor and 50 g. of crystal dextrose per 1 l. of culture medium were fed into the fermentor. Further, baker's yeast was added as the organism. The depth of liquid at this time was 100 cm. The cell concentration was 1.05% on a dry basis. By blowing air into the fermentor through an air-sparger having 99 holes of 2 mm. in diameter equipped on the lower part of the bubble column fermentor under a blowing pressure of about 0.1 kg./cm.G, cultivation was effected at the superficial gas velocity of 14.9 cm./sec. During the cultivation, the temperature was set at 32° C. and the pH in the range of 4.0–4.2. At the start of cultivation, the depth of the liquid was 208 cm., the gas hold-up was 0.520, and the mean density of the liquid within the column was 0.480 g./ml. After 5 hours' cultivation, the cell concentration became 1.88% on a dry basis. The depth of the liquid at this time was 258 cm., and no formation of foam layer was observed. Further, the gas hold-up was 0.613, and the mean density of the liquid within the column was 0.387 g./ml.

Example 2

In the wake of the cultivation in Example 1, by increasing the quantity of air being blown in, the superficial gas velocity was increased to 24.95 cm./sec. After 55 minutes' operation, the depth of the liquid became 254 cm. The gas hold-up was 0.606, and the mean density of the liquid within the column was 0.394 g./ml.

Example 3

In the wake of the cultivation in Example 2, by decreasing the quantity of air being blown in, the superficial gas velocity was set at 7 cm./sec. After 25 minutes' operation, foams generated one after another, overflowed the top of column and got balanced therewith about 5 minutes later. The total amount of the overflowed liquid was 6.0 kg. The depth of the liquid that remained in the column was about 300 cm., the gas hold-up was 0.852, and the mean density of the liquid within the column was 0.148 g./ml.

Example 4

By employing the same fermentor as in Example 1, the yeast for petroleum fermentation *Candida tropicalis* IAM 4862 was cultivated. The culture medium was prepared in the same way as that in Example 1 except that normal paraffin instead of crystal dextrose was prepared at the rate of 12 g. per 1 l. of culture medium, divided into 4 doses and applied in proportion to the growth of cells.

At the start of cultivation, the amount of the culture medium liquid was 29 l. and the depth of the liquid was 100 cm. But, as a result of aeration by blowing air through the air-sparger equipped on the lower part of the column under the conditions of a pressure of 0.09 kg./cm.$^2$.G and the superficial gas velocity of 18.9 cm./sec., the depth of the liquid became 170 cm. The cell concentration at this time was 0.04% on a dry basis.

After 24 hours' cultivation, the cell concentration became 0.786% on dry base. The depth of the liquid at this time was 223 cm. The gas hold-up was 0.551, and the mean density of the liquid was 0.449 g./ml. During the cultivation, the mean density of the culture medium liquid was maintained in the range of 0.6–0.45 g./ml., and there was observed no formation of foam layer.

What is claimed is:

1. In a process for cultivating microorganisms in which air is blown into the bottom of a bubble column fermentor containing a cultivation medium seeded with the microorganism being grown, to agitate the contents of the column and to improve growth of the microorganism, the improvement which comprises continuously blowing the air into the column so that the superficial gas velocity of the air flowing upwardly through the column is in the range of 14 to 32 cm./sec. during the entirety of the cultivation process, to reduce foaming in the column.

2. A process according to Claim 1, in which the contents of the column are free of defoaming agent.

References Cited
UNITED STATES PATENTS

| | | | |
|---|---|---|---|
| 2,828,246 | 3/1958 | Freaney | 195—109 |
| 3,405,920 | 10/1968 | Lefrancois | 195—109 X |

OTHER REFERENCES

Wegrich et al.: "Development of a Typical Aerobic Fermentation," Industrial & Engineering Chem., Vol. 45, pp. 1153–1160 (1953).

LIONEL M. SHAPIRO, Primary Examiner

R. B. PENLAND, Assistant Examiner

U.S. Cl. X.R.

195—142